United States Patent Office 3,269,887
Patented August 30, 1966

3,269,887
SETTABLE, FLEXIBLE, FOAMED RESINS
Leo J. Windecker, Midland, Tex., assignor to The Dow Chemical Company, Midland, Mich., a corporation of Delaware
No Drawing. Filed Aug. 7, 1963, Ser. No. 300,642
12 Claims. (Cl. 161—160)

This invention relates to foamed resins which are useful in the preparation of light-weight articles. More precisely, it concerns flexible foamed resins having open cells impregnated with a settable resin which hardens and produces a rigid light-weight structure after a brief interval during which the foam may be molded into the desired shape.

Foamed resins have gained wide acceptance in recent years for manufacturing light-weight structures such as insulating materials, boats, and other marine equipment. Shaped articles usually are obtained by foaming the resin within a mold. Another method involves carving or otherwise cutting a body of the rigid foam into the desired shape. In the fabrication of large structures such as boats and vehicle bodies having predominantly all curved surfaces it is extremely time consuming and expensive to shape the sections from rigid foam. On the other hand, foamed in place resins usually require an expensive enclosed mold. Other foams cannot reasonably be foamed in place due to pressures on mold walls.

Rigid foams usually have considerable strength and resistance to failure when loads are applied over an extended area; however a concentrated load produced by a small projectile can easily crush the rigid foam. It is customary to protect these foams from damage by such concentrated loads by coating them with a tough or rigid sheet of material. By using a flexible foam containing a hardening agent according to this invention, rigid foam structures coated with a tough material and having an irregular shape and increased resistance to failure under high intensity loads may be prepared easily by the hand lay-up method.

According to this invention, a flexible open-celled foam is impregnated with a resinous material which hardens after a brief interval to produce a tough, rigid, foamed body having the shape which was given it while in the flexible condition. Sheets of the foam impregnated with a settable resin can be placed in a form or mold and retained in the desired shape until they have become rigid. Thereafter the foam retains its pre-set shape and has greater compressive strength than the normally rigid foams.

The flexible foam may be any of the commercially available materials such as flexible polyurethane, sponge rubber, the cellulose foams, etc. The foam must be the type having at least 50 percent and preferably 85 percent open cells to facilitate impregnation with the settable resin. The particular method used to impregnate the foam is not critical. One simple but effective method is that of passing the foam through a vat containing the resin then squeezing out excess resin by withdrawing the foam from the vat through a set of pressure rolls. The open cells of the foam are left coated with a thin film of the resin which ultimately hardens, producing a light-weight foam body having a rigid cellular resinous structure within the flexible foam. The resin film on the outside aids in cementing the foam to other materials when it is used in a laminated structure. The amount of resin left in the foam can be controlled largely by the pressure on the rolls used to express the impregnating resin. Where extremely low density foam is desired the maximum pressure should be applied by the rolls. Less pressure may be used where higher compressive and tensile strengths are desired in the foam and the density is less critical.

The epoxy resins are effective hardening agents for the foam. The diglycidyl ethers of bisphenol A having an epoxide equivalent weight of about 170–192 and a viscosity of 4000–14,000 centipoises at 25° C. may be used along with a curing agent. Appropriate curing agents include the aliphatic polyamines or polyamides as well as acid anhydrides such as that of phthalic acid and the aromatic amines such as methylenedianiline. These agents will effect a cure within a period of a few hours at ambient temperature, or the rate of cure may be accelerated by heating the resin. In some instances it may be desirable to impregnate the foam with a resin containing little or no curing agent and add the curing agent later. Foam impregnated with an epoxy resin may be laid up then permeated with $BF_3$, a gaseous agent capable of effecting a rapid cure. The unsaturated polyester resins commonly used in laminations also may be used to impregnate and harden the foam. In some instances it may be desirable to mix the impregnating resin with a solvent or another agent which promotes the wetting of the flexible foam by the resin.

The hardenable flexible foams prepared according to this invention are useful in fabricating numerous articles having irregular shapes and requiring high strength as well as rigidity. Boats produced by laminating this type of foam with a resin containing glass fibers have high strength and rigidity, are light-weight and are non-sinkable. Structures of this type may be produced by the hand lay-up method. This is generally accomplished by building the structure on a mold or form which has been coated with a release agent. Alternate layers of glass fibers and a resin such as an epoxy or a polyester are applied to the coated mold. Thereafter sheets of the impregnated flexible foam are placed on the resin and glass fiber laminate and carefully pressed into the contours of the laminate. Where greater strength or protection for the foam is desired, additional resin and glass fiber laminations may be applied to the surface of the foam. After the laminated structure has cured to a rigid, tough structure, it may be peeled from the mold.

Laminated resins such as the epoxy and polyester resins containing glass fibers are extremely tough, however large sections of these materials are flexible and require stiffening members. The rigid foams produced according to this invention are particularly useful in producing rigid structures with the laminated resins by bonding a layer of the foam to the laminate. A layer no more than ¼ inch thick between fiber reinforced laminates greatly increases the rigidity of the laminates. Also, structural members such as beams may be shaped from the hardenable foam then bonded to the structure to be reinforced. Thus, these hardenable foams may be used to great advantage in the manufacture of irregularly shaped structures such as boats, automobile bodies, aircraft fuselages, etc., using the wet lay-up technique. Another utility for these foams is that of producing complex structures without using an equally complex mold. Segments of the structure may be shaped from the hardenable foam then these rigid segments cemented together and sandwiched between fiber-reinforced resin.

To demonstrate this method of hardening flexible foams a sheet of polyether polyurethane open-celled flexible foam one foot wide, four feet long and ¼ inch thick having a density of 1.5 pounds per cubic foot was saturated with a diglycidyl ether of bisphenol A containing diethylenediamine as a catalyst or curing agent. The impregnated foam was passed between a pair of rolls to remove excess resin. The sheet was then placed in a curved mold and allowed to cure. When the sheet was removed from the mold it retained the curved shape, had a density of approximately six pounds per cubic foot, and was rigid and strong in all directions. The hardened foam was open-celled and porous. Other samples of foam were treated in the same manner with resins containing silica flour to increase the strength of the foam without a substantial increase in density.

From the foregoing it can be seen that laminated light-weight resinous structures having high strength can be produced by impregnating a flexible foam with a settable resin and allowing the resin to harden or cure while the foam is maintained in the desired shape.

I claim:
1. A settable light-weight, flexible foam which can be formed into a desired shape then hardened to produce a rigid light-weight structure comprising an open-celled flexible foam having the open cells coated with a thin film of a settable resin and a curing agent therefor the cells in said resin remaining substantially open, thereby retaining said light-weight characteristics in said coated foam.
2. A settable foam according to claim 1 wherein said open-celled flexible foam is polyurethane foam.
3. A settable foam according to claim 1 wherein said settable resin is a diglycidyl ether of bisphenol A.
4. A settable foam according to claim 1 wherein said settable resin contains silica flour as a strengthening agent.
5. A laminated structure capable of forming a rigid member comprising a flexible open-celled foam having the open cells coated with a thin film of a settable resin and a curing agent therefor, the quantity of said resin being sufficient to produce a cellular resinous structure within said open cells and insufficient to fill said open cells, together with a fiber-reinforced resin bonded to at least one side of said coated foam.
6. A laminated structure according to claim 5 wherein said flexible open-celled foam is polyurethane foam having the open cells coated with a thin film of a settable diglycidyl ether of bisphenol A.
7. A rigid laminated structure comprising open-celled flexible polyurethane foam having the open cells coated with a quantity of rigid epoxy resin insufficient to fill the cells of said foam and having a fiber reinforced epoxy resin bonded to and covering the surfaces of said foam.
8. The method of producing a low density rigid article comprising:
impregnating an open-celled flexible foam with a settable resin and a curing agent therefor,
expressing excess resin from said foam and leaving a small quantity of said resin coating said open cells, the quantity of resin being insufficient to fill said cells,
molding said resin coated flexible foam into the desired shape, then
effecting the cure of said settable resin.
9. The method according to claim 8 wherein said open-celled flexible foam is polyurethane.
10. The method according to claim 8 wherein said settable resin is a diglycidyl ether of bisphenol A.
11. A method of molding a rigid low density resinous foam comprising:
impregnating a flexible open-celled foam with a settable resin containing a curing agent therefor,
expressing excess resin from said foam leaving a thin film of said resin in said open cells, then
molding said foam into the desired shape and maintaining said shape while said resin cures therein.
12. A method according to claim 11 wherein flexible polyurethane foam is impregnated with an epoxy resin.

References Cited by the Examiner
UNITED STATES PATENTS

| | | | |
|---|---|---|---|
| 2,632,752 | 3/1953 | Anderson | 260—40 |
| 2,642,920 | 6/1953 | Simon et al. | 161—161 X |
| 2,666,954 | 1/1954 | Potter. | |
| 2,682,515 | 6/1954 | Naps | 161—184 |
| 2,805,208 | 9/1957 | Roche | 161—159 |
| 2,863,797 | 12/1958 | Meyer | 18—59 |
| 3,009,207 | 11/1961 | Romesberg et al. | 161—160 |
| 3,025,200 | 3/1962 | Powers | 161—168 |
| 3,061,460 | 10/1962 | Schnickedanz | 117—98 |
| 3,070,476 | 12/1962 | Miller | 161—160 X |
| 3,082,611 | 3/1963 | Alvis et al. | 161—159 X |
| 3,142,855 | 8/1964 | Gilcrist | 161—159 X |
| 3,193,426 | 7/1965 | Schafer | 161—109 X |

FOREIGN PATENTS

| | | |
|---|---|---|
| 1,248,624 | 11/1960 | France. |

EARL M. BERGERT, *Primary Examiner.*

C. B. COSBY, *Assistant Examiner.*